United States Patent [19]
Kunimatsu et al.

[11] Patent Number: 6,013,701
[45] Date of Patent: Jan. 11, 2000

[54] METHOD FOR THE CONTINUOUS MANUFACTURING OF SILICONE RUBBER COMPOSITION

[75] Inventors: Kaoru Kunimatsu; Tomoo Kinoshita, both of Fukui Prefecture; Mitsuo Hamada, Chiba Prefecture, all of Japan

[73] Assignee: Dow Corning Toray Silicone Co., Ltd., Tokyo, Japan

[21] Appl. No.: 09/174,978

[22] Filed: Oct. 19, 1998

[30] Foreign Application Priority Data

Oct. 17, 1997 [JP] Japan ................................. 9-303722

[51] Int. Cl.⁷ ...................................... C08J 3/20
[52] U.S. Cl. .................. 523/351; 524/588; 264/211.23; 264/349; 264/211; 366/83; 366/91; 425/204; 425/205; 425/208
[58] Field of Search ............................ 523/351; 524/588; 264/211.23, 349, 211; 366/83, 91; 425/205, 204, 208

[56] References Cited

U.S. PATENT DOCUMENTS

| | | | |
|---|---|---|---|
| 4,649,005 | 3/1987 | Kobayashi et al. | 264/101 |
| 5,198,171 | 3/1993 | Kasahara et al. | 264/211.23 |
| 5,409,978 | 4/1995 | Hamada et al. | 524/265 |
| 5,908,592 | 6/1999 | Kimura et al. | 264/102 |

*Primary Examiner*—Margaret G. Moore
*Attorney, Agent, or Firm*—Jennifer S. Warren; William F. Boley

[57] ABSTRACT

A method for continuous preparation of a high consistency or liquid silicone rubber base does not cause abrasive wear of the extruder screw and of the extruder cylinder or blackening of the silicone rubber base even when the latter is admixed with such fillers as an inorganic filler in the form of a diatomaceous earth powder, quartz or a similar large-grained and hard substance, or with a fumed silica, sedimentary silica, or a similar reinforcing silica filler. The method comprises continuously kneading the following components in a multiple-stage shear type single-screw extruder: (A) a freely-flowable powdered silicone rubber mixture having its main components in the form of (a) a cross-linkable polydiorganosiloxane with a viscosity exceeding $1\times10^5$ mPa·s at 25° C. and (b) an inorganic filler, and (B) a high consistency silicone rubber base having its main components in the form of (a) a cross-linkable polydiorganosiloxane with a viscosity exceeding $1\times10^5$ mPa·s at 25° C. and (c) a reinforcing silica filler, or a liquid silicone rubber base having its main components in the form of (d) a cross-linkable polydiorganosiloxane with a viscosity below $1\times10^5$ mPa·s at 25° C. and (c) a reinforcing silica filler.

7 Claims, 2 Drawing Sheets

METHOD FOR THE CONTINUOUS MANUFACTURING OF SILICONE RUBBER COMPOSITION

For which the following is a specification:

The present invention relates to a method for continuously manufacturing a conventional silicone rubber base composition or a liquid silicone rubber base composition. This invention is also silicone rubber base composition that results from this method.

BACKGROUND OF THE INVENTION

A silicone rubber base composition comprises polydiorganosiloxane polymer and inorganic filler. When a curing component is added to the base, the composition becomes curable to a silicone rubber. A liquid silicone rubber base composition is one that is pumpable, while a high consistency silicone rubber base has a dough-like mass consistency.

In mixing curable liquid silicone rubber compositions, it is common practice in the art to first form a liquid silicone rubber base composition comprising polydiorganosiloxane gum and inorganic filler, usually a reinforcing silica filler as main components. If necessary, various additives are also mixed into the base composition. This base can then formed into a silicone rubber molded products by mixing it with polyorganohydrogensiloxane and a platinum catalyst, and then heating the mixture.

Typically in the art, the liquid silicone rubber base composition is produced by mixing the starting material components in a planetary-type mixer. However, mixers of the these types have low capacity and are unsuitable for mass production or continuous processing. Japanese Patent Publication 4-28008 teaches a method, according to which a silicone rubber base is produced by loading a liquid polydiorganosiloxane and a reinforcing silica filler to a dual-screw rotary kneader-extruder and continuously mixing the components under heating conditions.

A high consistency silicone rubber base normally has its main components in the form of a polyorganosiloxane gum and an inorganic filler. If necessary, various additives are also mixed into the high consistency based composition. The high consistency silicone rubber base can be formed into silicone rubber molded products by mixing it with polyorganohydrogensiloxane and a platinum catalyst, and then heating the mixture. The high consistency silicone rubber base is normally produced in combined kneader-mixers, internal mixers, or other rotary-type mixers. However, such mixers have low capacity and are unsuitable for mass production.

Japanese Patent Application 2-102007 teaches a method where a polydiorganosiloxane gum, an inorganic filler, and auxiliary agents are ground into a powder, and then the components are continuously mixed by passing them through a dual-screw unidirectional rotary kneader-extruder. Japanese Patent Application 6-313046 describes a process in which a polydiorganosiloxane gum, an inorganic filler, and auxiliary agents are continuously mixed in a dual-screw unidirectional rotary kneader-extruder and then their mixture is again mixed under heating conditions in a counter-rotating dual-screw kneader-extruder.

The continuous manufacturing processes of the above references require the use of a dual-screw kneader-extruder with a large length to diameter (L/D) ratio. However, when inorganic filler materials such as fumed silica, sedimentary silica, or similar reinforcing silica fillers are used in large proportions, such as more than 50 parts by weight per 100 parts by weight of the polydiorganosiloxane, or when the mixture contains inorganic fillers of high hardness or with large diameter grains, such as diatomaceous earth powder, quartz powder, or alumina powder, these materials cause abrasive wear on the surfaces of the screws and cylinders of aforementioned dual-screw mixer-extruders. This not only results in the blackening of the silicone rubber composition during mixing, but also gradually decreases the effect of kneading.

SUMMARY OF THE INVENTION

The present invention provides continuous manufacturing of a either a liquid silicone rubber base composition or a high consistency silicone rubber base composition by a method that does not cause blackening of the mixed silicone rubber composition, and does not cause abrasive wear of the screw and cylinder, even if the inorganic filler comprises a diatomaceous earth, or quartz, alumina, or similar large-grained powder material of high hardness, or if fumed silica, precipitated silica, or similar reinforcing silica is used in high quantities.

The present invention is a method for continuously manufacturing a high consistency or liquid silicone rubber base, comprising continuously kneading the following components in a multiple-stage shear type single-screw extruder: (A) a freely-flowable powdered silicone rubber comprising (a) a cross-linkable polydiorganosiloxane (b) an inorganic filler, and (B) either a high consistency silicone rubber base or a liquid silicone rubber base.

REFERENCE NUMERALS USED IN THE SPECIFICATION AND DRAWINGS

Figure 1:
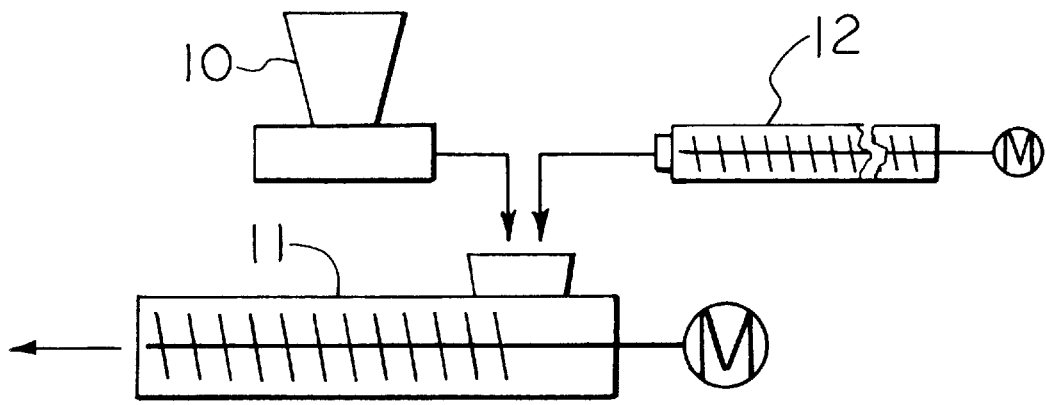
FIG. 1 is a sectional view of a metering feeder 10, a dual-screw kneader-extruder 12 and a multiple-stage single-screw shear-type extruder 11 used in accordance with the present invention.

1 Extruding screw
2 Cylinder
3 Disk
3a Facing surface of disk
4 Circular projection
4a Facing surface of circular projection
5 Starting material feeding opening
6 Unloading opening
7 Helical blade of extruding screw 1
8 Filter
9 Outlet nozzle
10 Metering feeder
11 Multiple-stage single-screw shear-type extruder
12 Dual-screw kneader-extruder
31 Recesses on facing surfaces 3a
32 Projections on facing surfaces 3a
41 Recesses on facing surfaces 4a 42 Projections on facing surfaces 4a
M Motor

DETAILED DESCIPTION OF THE INVENTION

The present invention is a method for continuously manufacturing a high consistency or liquid silicone rubber base, comprising continuously kneading the following components in a multiple-stage shear type single-screw extruder:

(A) a freely-flowable powdered silicone rubber mixture comprising (a) a cross-linkable polydiorganosiloxane with a viscosity exceeding $1\times10^5$ mPa·s at 25° C. and (b) an inorganic filler, and (B) a high consistency silicone rubber base comprising (a) a cross-linkable polydiorganosiloxane with a viscosity exceeding $1\times10^5$ mPa·s at 25° C. and (c) a reinforcing silica filler, or a liquid silicone rubber base having its main components in the form of (d) a cross-linkable polydiorganosiloxane with a viscosity below $1\times10^5$ mPa·s at 25° C. and (c) a reinforcing silica filler.

The multiple-stage shear type single-screw extruder suitable for the present method comprises: a cylinder with a starting-material feed opening at one end and an unloading opening at the other end; an extruding screw inserted into said cylinder, said extruding screw having a plurality of disks attached to said screw in a position perpendicular to said screw, a plurality of circular projections extending from the inner periphery of said cylinder and being arranged in the axial direction of said screw, said disks being rotatingly installed between said circular projections, facing surfaces of said disks and said circular projections having radially-extending projections and recesses.

The cross-linkable polydiorganosiloxane which is component (a) suitable for the purposes of the present invention is a conventional linear polydiorganosiloxane which contains in one molecule two or more than two low-alkenyl groups, for example vinyl groups. Since the powdered silicone rubber composition cannot be easily obtained when the viscosity is low, it is recommended that the viscosity at 25° C. be greater than $1\times10^5$ mPa·s and preferably within a range of $1\times10^6$ mPa·s to $1\times10^8$ mPa·s. Polydiorganosiloxane of this type is known and commercially produced. A typical example of the polydiorganosiloxane is a linear polymer represented by the following general formula: $R^1(R_2SiO)_nSiR_2R^1$, where R is a non-substituted or substituted monovalent hydrocarbon group which contains 0 to 0.1% of vinyl groups, $R^1$ is a non-substituted or substituted monovalent hydrocarbon group or a hydroxyl group, and n is between 1,800 and 10,000. In this formula R may be an alkyl group represented by a methyl group, an allyl group represented by a phenyl group, an alkenyl group represented by a vinyl group, and a substituted alkyl group represented by a 3,3,3-trifluoropropyl group. Examples of $R^1$ are a methyl group, a vinyl group, a phenyl group, and a hydroxyl group. In the molecule, the alkenyl group may exist only at both terminals, in a side chain, or at both terminals and in the side chain at the same time. Component (a) may also be of a linear-chain type with some branches. Component (a) in (A) and component (a) in (B) may be the same or different. Their specific examples are the following compounds (except for those which do not contain two or more than two vinyl groups in one molecule): a copolymer of a methyl (3,3,3-trifluoropropyl)siloxane and a methylvinylsiloxane copolymer, a methyl (3,3,3-trifluoropropyl) polysiloxane, a copolymer of a dimethylsiloxane and a methyl (3,3,3-trifluoropropyl)siloxane, a copolymer of dimethylsiloxane, methylvinylsiloxane, and phenylmethylsiloxane, a copolymer of dimethylsiloxane and phenylmethylsiloxane, a copolymer of dimethylsiloxane and methylvinylsiloxane, a polydimethylsiloxane having both molecular terminals sealed with dimethylvinylsiloxy groups, trimethylsiloxy groups, or silanol groups.

The inorganic filler which is component (b) of the present invention may be any filler suitable for use in combination with a silicone rubber composition. Such an inorganic filler may be represented by a fumed or dried-process silica, wet or sedimentary silica, or a similar reinforcing silica having a specific surface area greater than 50 m²/g, a reinforcing silica the surface of which has been subjected to hydrophobic treatment with an organic silicon compound (e.g., dimethyldichlorosilane, trimethylchlorosilane, hexamethyldisilazane), a diatomaceous earth powder, quartz powder, powdered aluminum hydroxide, powdered aluminum oxide, powdered magnesium oxide, powdered calcium carbonate, or a similar extending type filler. Most advantageous for the method of the present invention among the above are a diatomaceous earth powder, a quartz powder, an alumina powder, or a similar filler of high hardness and with grains of large diameter. Such fillers may be used individually or in combination of two or more than two.

Although there are no special limitations with regard to the quantity of component (b) used in the process, it is recommended that this amount be sufficient to impart to component (A) the state of a freely flowable powder. If component (b) is an extending-type filler, it should be used in the amount of 5 to 200 parts by weight, preferably 10 to 150 parts by weight for 100 parts by weight of component (a). If, however, component (b) is a reinforcing silica filler, it should be used in an amount of 20 to 100 parts by weight per 100 parts by weight of component (a). For the method of the present invention it is preferable to have (b) in component (A) in an amount greater than the amount of (c) in component (B).

The reinforcing silica filler component (c) may be represented by a fumed or dry-process silica, wet-process or sedimentary silica, or a reinforcing silica filler the surface of which has been subjected to hydrophobic treatment with an organic silicone compound (e.g., dimethyldichlorosilane, trimethylchlorosilane, methyltrichlorosilane, hexamethyldisilazane).

If component (c) is to be added to component (a), it is recommended that the added amount be sufficient to maintain the mixture in a high consistency state, preferably be within the range of 20 to 80 parts by weight against 100 parts by weight of component (a). If component (c) is combined with component (d), it is recommended that the added amount be sufficient to maintain the mixture in a liquid state, preferably be within the range of 10 to 60 parts by weight against 100 parts by weight of component (a).

The cross-linkable polydiorganosiloxane which is component (d) with a viscosity below $1\times10^5$ mPa·s at 25° C. is a linear-chained polydiorganosiloxane which contains in one molecule two or more than two low-alkenyl groups usually represented by vinyl groups. Preferably, it should have a viscosity within the range of 100 mPa·s to $2\times10^4$ mPa·s. It has been known in the art to use an appropriate polydiorganosiloxane as a liquid silicone rubber base. A typical example thereof is a linear polymer represented by the following general formula: $R^1(R_2SiO)_nSiR_2R^1$ (where R is a non-substituted or substituted monovalent hydrocarbon group which contains 0 to 10 mole % of vinyl groups, $R^1$ is a non-substituted or substituted monovalent hydrocarbon group or a hydroxyl group, and n is between 80 and 1800).

Examples of R are a substituted alkyl group represented by a 3,3,3-trifluoropropyl group, an alkenyl group represented by a vinyl group, an allyl group represented by a phenyl group, and an alkyl group represented by a methyl group. Examples of $R^1$ are a methyl group, a vinyl group, a phenyl group, and a hydroxyl group. In the molecule, alkenyl groups may be present only on both molecule terminals, only in side chains, or on molecular terminals and in side chains at the same time. Component (d) may also be a linear group which to some extent is branched.

If components (b) and (c) are untreated reinforcing silica fillers, in order to improve dispersity of the reinforcing silica filler during kneading, to reduce creep hardening and to adjust plasticity after the kneading, it is recommended to add to a mixture of components (a) and (b), components (a) and (c), or components (d) and (c), a plasticizer (e) such as a dimethyldimethoxysilane, a terminal-silanol type polydimethylsiloxane with low degree of polymerization, a diphenylsilanediol, trimethylhydroxysilane, or the like. It is recommended that component (e) be used in an amount of 0.5 to 40 parts by weight against 100 parts by weight of the reinforcing silica filler. If necessary, the silicone rubber can be combined with other conventional additives such as silicone-resin type reinforcing agents, heat-resistant agents, combustion-retarding agents, adhesion-imparting agents, dyes, agents improving processing by rolling, mold-release agents.

In the method of the present invention, a freely flowable powdered silicone rubber composition is prepared first. Components (a) and (b), are loaded into a rotary mixer of the type which has mixing blades which rotate with a high speed, such as a Henschel mixer. Then the mixture is turned into a freely-flowable powder mixture, component (A), by shearing while being heated to a temperature of 100 to 200° C.

Components (a) and (c) are mixed to a uniform state of the mixture either in combined kneader-mixers, internal mixers, or in other rotary-type mixers, or loaded into dual-screw kneader-extruders and continuously kneaded into a high consistency silicone-rubber base. In order to ensure improved stability in a free state and rolling after the kneading of components (a) and (c), it is recommended that kneading be conducted with heating at 100 to 280° C.

Alternatively, components (d) and (c) are mixed to a uniform state of the mixture either in a combined kneader-mixer, a planetary mixer, or in another rotary-type mixer, are loaded into a two-screw kneader-extruder and continuously kneaded into a liquid silicone-rubber base. In order to ensure improved rolling after mixing with component (a), as well as to improve flowability and stability in a free state, it is recommended that kneading be conducted with heating at 100 to 300° C.

As shown in FIG. 1, an appropriately prepared freely-flowable powdered mixture (A) is continuously supplied via a metering feeder 10 to a starting-material feed opening 5 of a single-screw multiple-stage shear-type extruder 11. At the same time, a metered amount of high consistency or liquid silicone rubber base (B) is loaded into same starting-material feed opening 5. It is recommended that the high consistency silicone rubber base be supplied from a two-screw extruder-kneader by cutting it into pieces of a predetermined length. As far as the liquid silicone rubber base is concerned, it is recommended that this component be supplied by a gear pump.

Figure 2:
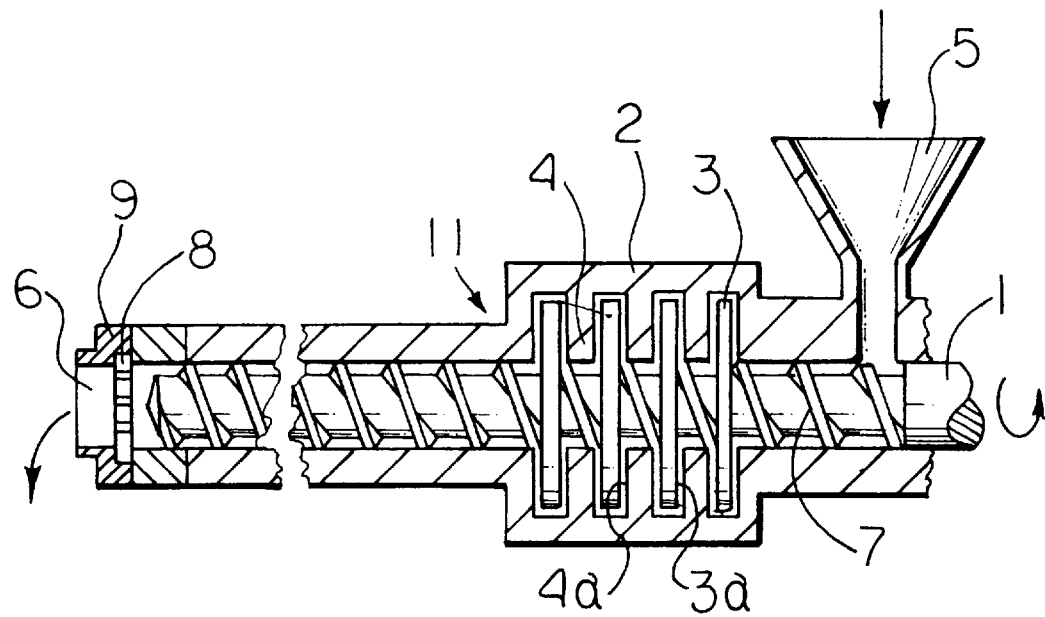
FIG. 2 is a sectional view of multiple-stage single-screw shear-type extruder 11 used in accordance with one practical example of the present invention.

As shown in FIG. 2, multiple-stage shear type single-screw extruder 11 consists of a cylinder 2 with a starting-material feed opening 5 at one end and an unloading opening 6 at the other end and an extruding screw 1 inserted into aforementioned cylinder 2. Extruding screw 1 is connected to a motor, designated in the drawing as M. Extruding screw 1 has a plurality of disks 3 attached to it in positions perpendicular to the screw. A plurality of circular projections 4 extend from the inner periphery of cylinder 2. These projections are arranged in the axial direction of screw 1. Disks 3 are rotatably installed between circular projections 4. Facing surfaces 3a of disks 3 and facing surfaces 4a of circular projections 4 have radially-extending recesses and projections 31, 32 and 41, 42, respectively.

Facing surfaces 3a of disks 3 and facing surfaces 4a of circular projections 4 are not in contact with each other. Similarly, the outer peripheral surfaces of disks and inner peripheral surfaces of cylinder 2 do not have physical contact. The inner peripheral surfaces of circular projections 4 and the outer peripheral surface of extruding screw 1 also do not have contact. Thus, the mixture passes through the gaps between aforementioned parts.

Extruding screw 1 has a helical blade 7 attached to its outer surface. When the screw rotates, helical blade 7 conveys components (A) and (B), which are supplied via a material feeding opening 5, in the axial direction of the screw along the space between disks 3 and circular projections 4.

Figure 3:
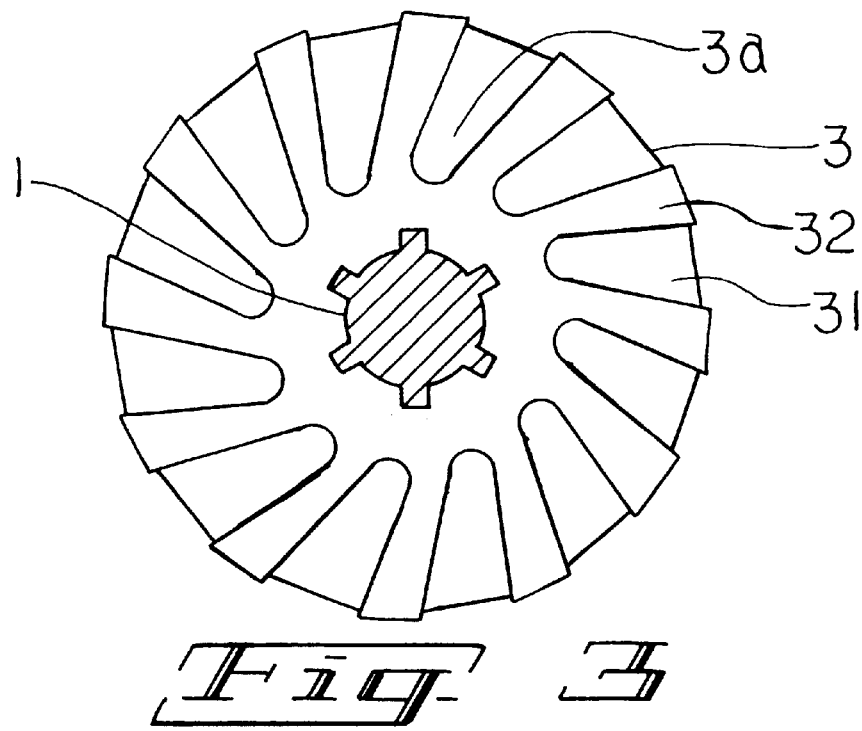
FIG. 3 is face view of disk 3 which is fixed to extruding screw 1 of multiple-stage single-screw shear-type extruder 11.
Figure 4:
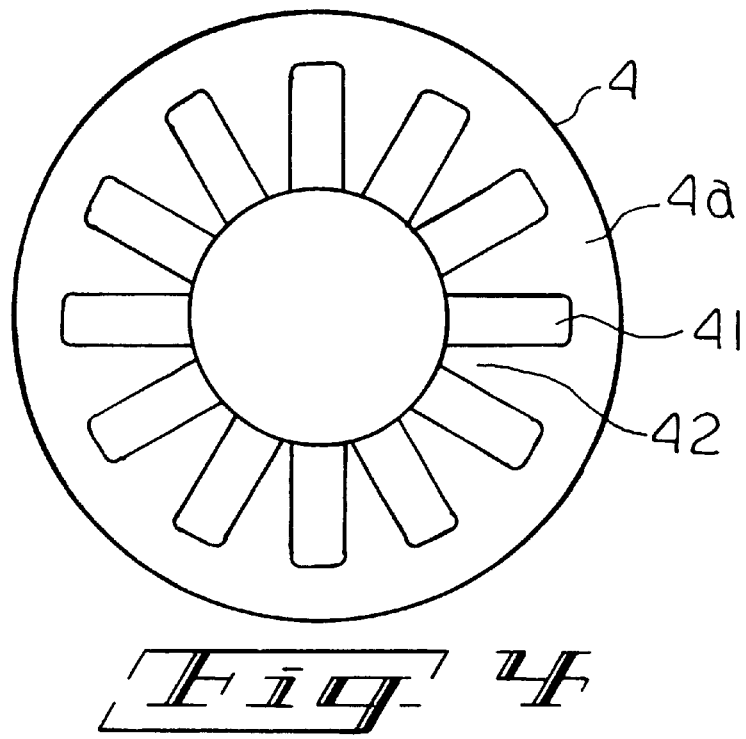
FIG. 4 is a face view of circular projection 4 extending from the inner peripheral surface of cylinder 2 in multiple-stage single-screw shear-type extruder 11.

Radially-extending recesses 31 and projections 32 on surfaces 3a of disks 3, shown in FIG. 3, and radially-extending recesses 41, and projections 42 on facing and facing surface 4a of circular projections 4, shown in FIG. 4, impart to components (A) and (B) a shearing force. As components (A) and (B) pass sequentially between disks 3 and circular projections 4, they experience the effect of repeating shearing actions, whereby they are converted into uniformly mixed silicone rubber base composition having a high consistency form, or alternatively a liquid-like consistency. The resulting uniformly mixed silicone rubber base composition is passed via a filter 8, through outlet nozzle 9, and is unloaded through unloading opening 6. It is recommended that the gap between disks 3 and circular projections 4 be within the range of 0.3 to 3 mm.

Multiple-stage shear type single-screw extruder 11, shown in FIG. 2, has four disks 3 and three circular projections 4. If necessary, however, the number of disks and projections can vary from 2 to 10. Furthermore, metering feeder 10 continuously supplies dosed quantities of the powdered silicone rubber composition to the multiple-stage shear type single-screw extruder. However, feeders of other type which are similar in function can be employed for this purpose.

EXAMPLES

In these examples, the quantities are indicated in parts by weight, and viscosities are indicated at 25° C. Plasticity of the silicone rubber was measured according to JIS K6300. Suitability for rolling was measured by repeatedly passing the material between two rollers. Physical properties of a silicone rubber sheet were measured in compliance with the requirements of JIS K6301.

Suitability for rolling under industrial conditions was evaluated as follows: the silicone rubber composition dose not pass the test if after passing between calendar rolls the material does not wind onto the roll and falls down; the results are positive if after passing between calendar rolls the material is wound onto the roll and does not fall.

PRACTICAL EXAMPLE 1

A mixture was prepared of the following components: 100 parts of a dimethylsiloxane-methylvinylsiloxane copolymer gum (containing 0.2 mole % of methylvinylsiloxane units) with both molecular chain terminals blocked with trimethylsiloxy groups, the viscosity being $15 \times 10^6$ mPa·s; 60 parts of fumed silica having a specific surface area of 200 m²/g; 96 parts of quartz powder with a 5 μm average grain diameter; and 18 parts of polydimethylsiloxane of 50 mPa·s viscosity with silanol groups on both molecular terminals. The mixture was loaded into a Henschel mixer, heated to 150° C., and was mixed for 10 min with 1,000 rpm speed of the rotating blade. As a result, a freely-flowable powdered silicone rubber composition was obtained.

This powdered silicone rubber composition was loaded into a metering feeder 10 shown in FIG. 1, from where the material was supplied with a rate of 10 kg/hr into starting-material loading opening 5 of multiple-stage shear-type single-screw extruder 11.

At the same time, a dual-screw kneader-extruder with counter-rotating screws and with the cylinder heated to 230° C. was loaded with 100 parts of the aforementioned green rubber, 30 parts of the sedimentary silica having a 230 m²/g specific surface area, and 3 parts of a polydimethylsiloxane having a 50 mPa·s viscosity and both terminals blocked with silanol. A high consistency silicone rubber base continuously produced in the above process was sent with a flow rate of 30 kg/h from the unloading opening of the aforementioned two-screw kneader-extruder to a starting-material loading opening 5 of multiple-stage shear-type single-screw extruder 11 via a cutting mechanism which is not shown in the drawings. The obtained high consistency silicone rubber base had plasticity equal to 230.

A distance between starting-material loading and unloading openings 5 and 6 of multiple-stage shear-type single-screw extruder 11 was equal to 1,500 mm. Extruding screw 1 had a diameter of 65 mm. The screw rotated with a speed of 50 rpm. A feed screw (not shown in the drawings) parallel to extruding screw 1 was installed directly beneath starting-material loading opening 5. There were four disks 3. Disks 3 and circular projections 4 both had a diameter of 140 mm. A gap between disks 3 and the inner projections 4 was equal to 1.0 mm. The gaps between extruding screw 1 and inner surface of cylinder 2, between disks 3 and inner surface of cylinder 2, and between inner projections 4 and extruding screw 1 were all equal to 1.0 mm. The surfaces of the extruder which are to be in contact with the freely-flowable powdered mixture (A) and high consistency or liquid silicone rubber base (B) were made of a wear-resistant steel. Components (A) and (B) were kneaded in the aforementioned extruder and were unloaded through unloading opening 6 of the extruder as a uniform high consistency or liquid silicone rubber base. The color of the obtained silicone-rubber base was observed, its plasticity was measured, and its suitability for treatment with calendar rollers was tested. The results are shown in Table 1. One hundred parts of the silicone rubber base were combined with 0.5 parts of 2.5-dimethyl-2.5-di(t-butylperoxy)hexane. The base was uniformly mixed between two rolls, and, as a result, a hardener-containing silicone rubber composition was prepared. This silicone rubber composition was formed into a 2 mm-thick silicone-rubber sheet by pressure molding for 10 min. at a temperature of 170° C. Physical properties of the aforementioned sheet were measured. The results of measurement are shown in Table 1.

COMPARATIVE EXAMPLE 1

The high consistency silicone rubber base was prepared in the same manner as in Practical Example 1, with the exception that the high consistency silicone rubber base and the mixture used in Practical Example 1 were loaded into the starting-material loading opening of a two-screw kneader-extruder with the screws rotating in the same direction. The extruder had 50 mm screw diameters, an L/D ratio equal to 40, a 0.25 mm gap between the extruding screws and the inner surface of the cylinder. The extruding screws rotated with a speed of 300 rpm. The surfaces which are to be in contact with the silicone rubber composition were made of a wear-resistant steel. The material was continuously fed, with the same flow rate as in Practical Example 1, into starting material feed opening of the dual-screw kneader-extruder in which the interior of the cylinder was maintained at a temperature of 230° C. The color of the obtained silicone-rubber composition was observed, its plasticity was measured, and its suitability for treatment with calendar rollers was tested. The results are shown in Table 1. The obtained silicone rubber composition was formed into a sheet and cured under the same conditions as in Practical Example 1, and the physical properties of the sheet were measured. The results are shown in Table 1.

TABLE 1

| Examples<br>Properties | Practical<br>Example 1 | Comparative<br>Example 1 |
| --- | --- | --- |
| Appearance (color) | White | Black |
| Suitability for Rolling | Suitable | — |
| Plasticity (mm × 100) | 270 | 280 |
| Hardness | 60 | 61 |
| Tensile strength (kgf/cm²) | 78 | 75 |
| Elongation (%) | 350 | 320 |
| Tearing strength (kgf/cm) | 13 | 11 |

PRACTICAL EXAMPLE 2

A freely-flowable powdered mixture was prepared by mixing 100 parts of the green rubber used in Practical Example 1, a fumed silica in an amount of 60 parts with a 200 m²/g specific surface area, and 18 parts of polydimethylsiloxane having silanol on both terminals and having a 50 mPa·s viscosity. The components were mixed for 10 min. in a Henschel mixer at 150° C. with the rotation speed of the mixer equal to 1000 rpm. The obtained mixture was loaded into a low-weight feeder 10 and from this feeder the mixture was continuously loaded with a rate of 5 kg/hr to feed opening 5 of a multiple-stage shear type extruder 11. At the same time, 100 parts of polydimethylsiloxane having 4000 mPa·s viscosity and dimethylvinylsiloxy groups at both terminals and having 0.23 wt. % of vinyl groups, and 35 parts of a wet-process silica having 230 m²/g specific surface area were mixed at 180° C. in a planetary mixer. As a result, a liquid silicone rubber base was produced. By using a gear pump as a feeder, the obtained product was continuously fed at a rate of 30 kg/hr to a starting material feed opening of 5 of a multiple-stage shear-type single-screw extruder 11. Except for the fact that this extruder had six rotating disks and a 0.5 mm gap between rotating disks 3 and circular projections 4, other features of the extruder were the same as in multiple-stage shear-type single-screw extruder of the Practical Example 1. The freely-flowable powdered mixture and the liquid silicone rubber base were kneaded in the aforementioned multiple-stage shear-type single-screw extruder 11, and were unloaded via unloading opening 6 in the form of a milky-white semitransparent liquid silicone rubber base.

100 parts of the obtained liquid silicone rubber base were uniformly mixed with 2 parts of a polymethylhydridosiloxane of 20 mPa·s viscosity with trimethylsiloxy groups on both terminals (0.8% of silicon-bonded hydrogen atoms), 0.4 parts of a complex salt of a chloroplatinic acid and a divinyltetramethyldisiloxane (0.4 wt. % platinum concentration), and 0.2 parts of a curing retardant in the form of a 3,5-dimethyl-1-hexyn-3-ol. The mixture was press-formed at 150° C. for 10 min. into a 2 mm-thick silicone-rubber sheet. Properties of the obtained sheet were measured in accordance with the requirements of JIS K6301. Dispersity of the freely-flowable powdered mixture were evaluated visually by applying the obtained liquid silicone rubber base in the form of a thin film onto a transparent resin film. The results of the observation are shown in Table 2.

TABLE 2

| Presence or absence of the freely-flowable fine-powder mixture | Absent |
|---|---|
| Hardness | 40 |
| Tensile strength (kgf/cm$^2$) | 60 |
| Elongation (%) | 300 |

COMPARATIVE EXAMPLE 2

The liquid silicone rubber base was prepared in the same manner as in Practical Example 2, with the exception that instead of a multiple-stage single-screw shear-type extruder of Practical Example 2, the freely-flowable powdered mixture and the liquid silicone rubber base used in Practical Example 2 were loaded into the starting-material loading opening of a dual-screw kneader-extruder with the screws rotating in the same direction. The extruder had 50 mm screw diameters, an L/D ratio equal to 40, and a 0.25 mm gap between the extruding screws and the inner surface of the cylinder. The extruding screws rotated with a speed of 300 rpm. The surfaces which are to be in contact with the silicone rubber composition were made of a wear-resistant steel. The material was continuously fed, with the same flow rate as in Practical Example 2, into the starting material feed opening of the dual-screw kneader-extruder in which the interior of the cylinder was maintained at a temperature of 230° C. The silicone rubber base had a black-ash color.

We claim:

1. A method for continuously manufacturing a high consistency or liquid silicone rubber base, comprising continuously kneading the following components in a multiple-stage shear single-screw extruder:

(A) a freely-flowable powdered silicone rubber comprising (a) a cross-linkable polydiorganosiloxane with a viscosity exceeding $1\times10^5$ mPa·s at 25° C. and (b) an inorganic filler, and (B) a high consistency silicone rubber base comprising (a) a cross-linkable polydiorganosiloxane with a viscosity exceeding $1\times10^5$ mPa·s at 25° C. and (c) a reinforcing silica filler, or a liquid silicone rubber base comprising (d) a cross-linkable polydiorganosiloxane with a viscosity below $1\times10^5$ mPa·s at 25° C. and (c) a reinforcing silica filler.

2. The method of claim 1, where both components (a) and (d) are polydiorganosiloxanes which contain vinyl groups, and component (b) comprises a reinforcing silica filler.

3. The method of claim 1, wherein said components (A) and (B) are further combined with a plasticizer.

4. The method of claim 1, wherein said freely-flowable powdered silicone rubber mixture is prepared by subjecting components (a) and (b) to high-speed mechanical shearing of about 1000 rpm.

5. The method of claim 4, where the high-speed mechanical shearing is carried out at a temperature of 100 to 200° C.

6. The method of claim 1 where component (b) is selected from the group consisting of diatomaceous earth powder, quartz powder, and alumina powder.

7. The method of claim 1, where the multiple-stage shear type single-screw extruder comprises:

a cylinder with a starting-material feed opening at one end and an unloading opening at the other end;

an extruding screw inserted into said cylinder, said extruding screw having a plurality of disks attached to said screw in a position perpendicular to said screw; and a plurality of circular projections extending from the inner periphery of said cylinder and being arranged in the axial direction of said screw, said disks being rotatably installed between said circular projections, facing surfaces of said disks and said circular projections having radially-extending projections and recesses.

* * * * *